US008947793B2

(12) United States Patent  (10) Patent No.: US 8,947,793 B2
Morooka  (45) Date of Patent: Feb. 3, 2015

(54) INNER FOCUS LENS SYSTEM AND IMAGE PICKUP APPARATUS USING THE SAME

(71) Applicant: Olympus Imaging Corp., Tokyo (JP)

(72) Inventor: Masaru Morooka, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 78 days.

(21) Appl. No.: 13/707,758

(22) Filed: Dec. 7, 2012

(65) Prior Publication Data

US 2013/0162887 A1  Jun. 27, 2013

(30) Foreign Application Priority Data

Dec. 21, 2011 (JP) ................................ 2011-279434

(51) Int. Cl.
G02B 9/34 (2006.01)
G02B 15/14 (2006.01)
G02B 15/22 (2006.01)
G02B 15/177 (2006.01)

(52) U.S. Cl.
CPC ............... G02B 15/14 (2013.01); G02B 15/22 (2013.01); G02B 9/34 (2013.01); G02B 15/177 (2013.01)
USPC ........... 359/781; 359/684; 359/686; 359/715; 359/771

(58) Field of Classification Search
CPC .............. G02B 9/00; G02B 9/34; G02B 9/36; G02B 13/20; G02B 15/00; G02B 15/22; G02B 15/24
USPC .................. 359/676, 684, 686, 754, 771, 779
See application file for complete search history.

(56) References Cited

U.S. PATENT DOCUMENTS

| 6,687,059 B2 * | 2/2004 | Mihara ......................... 359/681 |
| 6,865,031 B2 | 3/2005 | Hoshi |
| 7,106,520 B2 * | 9/2006 | Saori ............................. 359/681 |
| 7,903,348 B2 | 3/2011 | Sensui |
| 7,940,478 B2 | 5/2011 | Take |
| 8,027,100 B2 | 9/2011 | Take |
| 8,125,561 B2 | 2/2012 | Amanai |
| 2010/0033834 A1 * | 2/2010 | Matsusaka et al. ........... 359/682 |
| 2010/0194928 A1 | 8/2010 | Amanai |
| 2011/0141583 A1 | 6/2011 | Take |
| 2012/0212833 A1 * | 8/2012 | Hosoi et al. ................... 359/684 |

FOREIGN PATENT DOCUMENTS

| JP | 2003-241084 | 8/2003 |
| JP | 2009-237542 | 10/2009 |
| JP | 2009-258157 | 11/2009 |
| JP | 2010-066432 | 3/2010 |
| JP | 2010-170084 | 8/2010 |
| JP | 2012-220654 | 11/2012 |
| WO | 2008/072466 | 6/2008 |

* cited by examiner

Primary Examiner — Thong Nguyen
(74) Attorney, Agent, or Firm — Kenyon & Kenyon LLP

(57) ABSTRACT

An inner focus lens system comprises, in order from an object side to an image side, a first lens unit, an aperture stop, a second lens unit having a positive refractive power, a third lens unit having a negative refractive power, and a fourth lens unit having a positive refractive power. The first lens unit has at least one negative lens and at least one positive lens, the second lens unit has at least one negative lens and at least one positive lens, the third lens unit has at least one negative lens, and the fourth lens unit has at least one positive lens. When focusing on an object at a short distance from an object at infinity, the third lens unit moves to lengthen a distance to the second lens unit and to shorten a distance to the fourth lens unit.

40 Claims, 8 Drawing Sheets

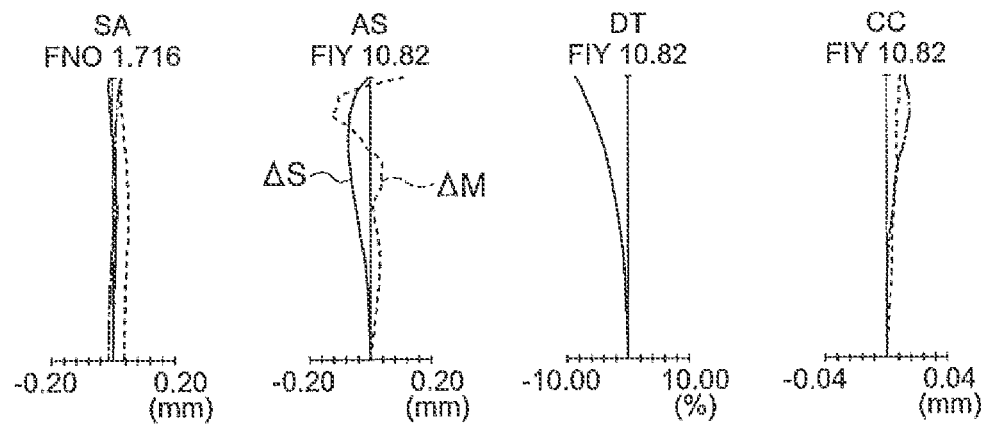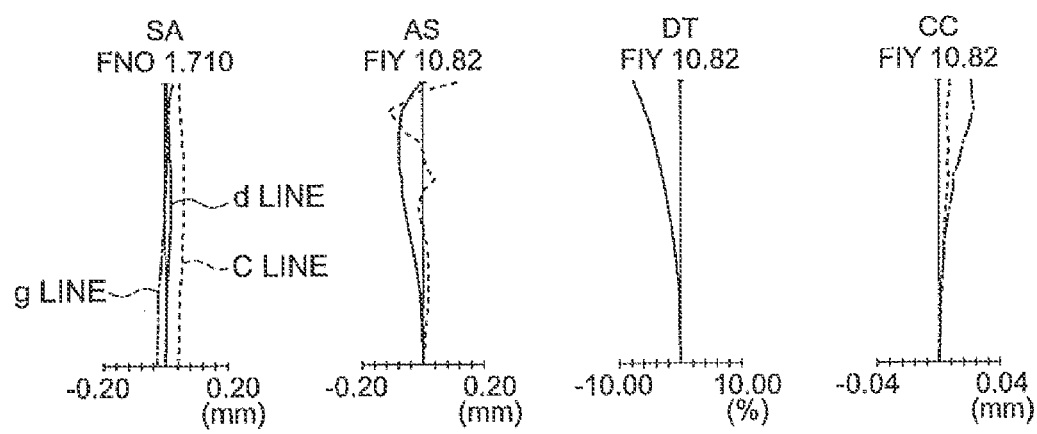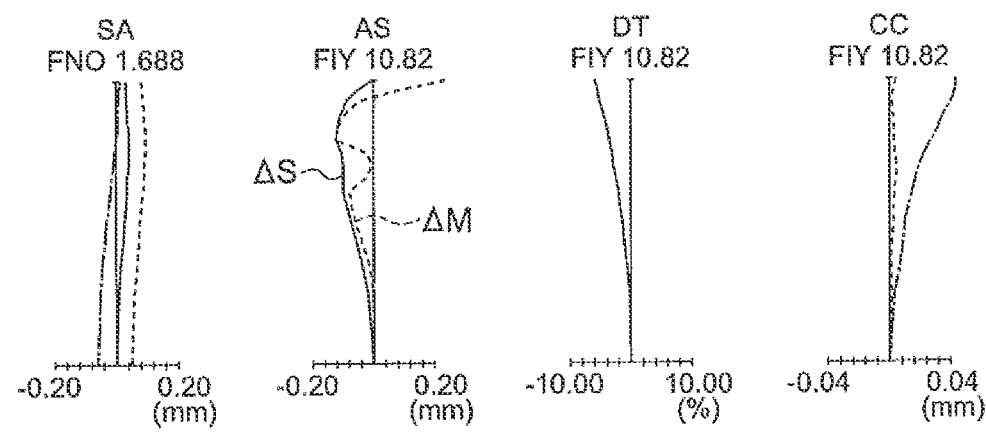

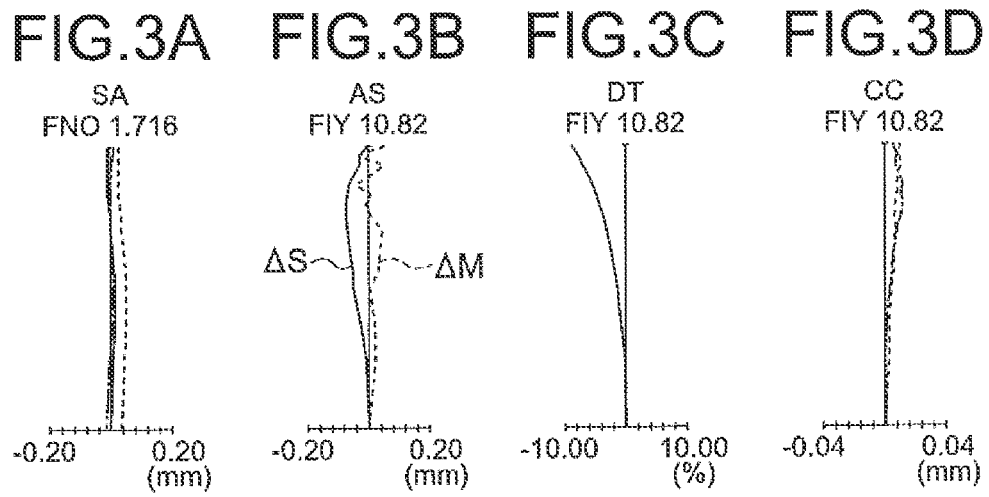
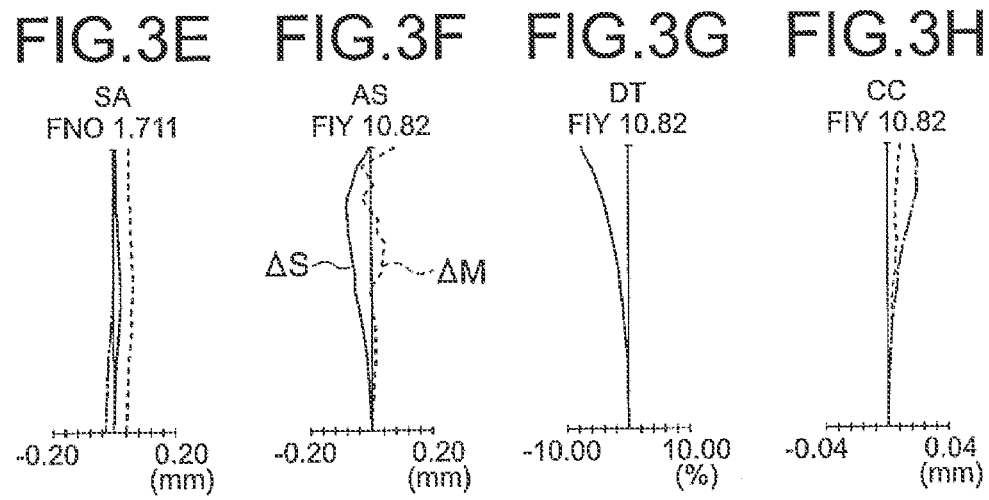
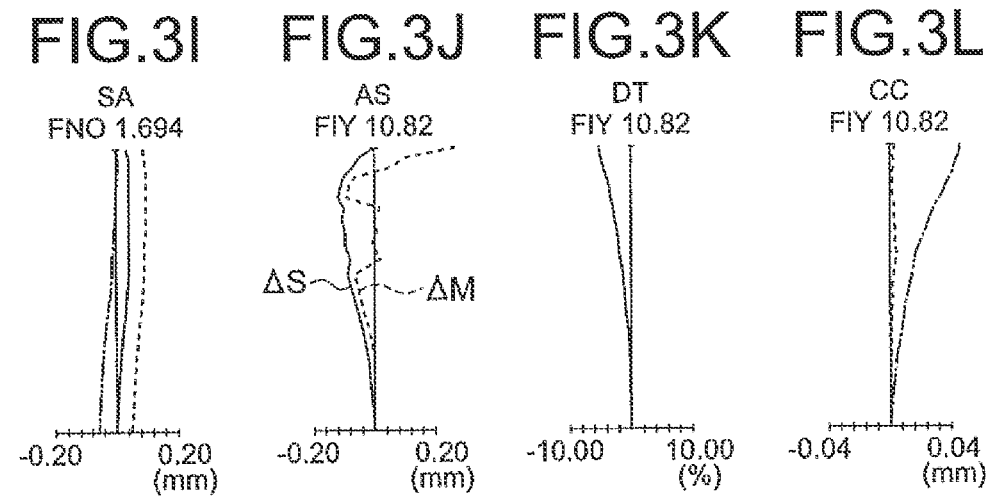

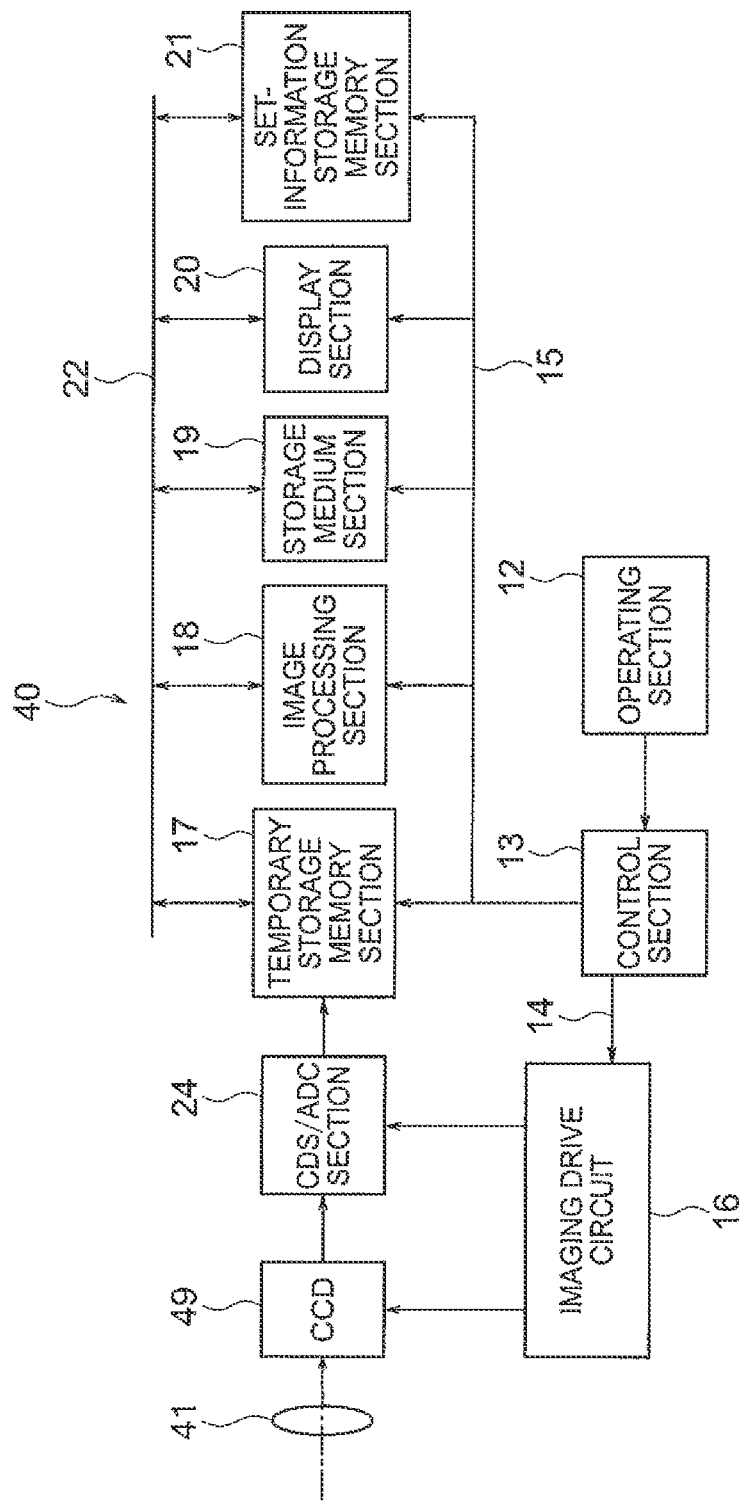

INNER FOCUS LENS SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2011-279434 filed on Dec. 21, 2011; the entire contents of which are incorporated herein by reference.

BACKGROUND OF THE INVENTION

1. Field of the Invention

The present invention relates to an inner focus lens system and an image pickup apparatus using the same.

2. Description of the Related Art

Conventionally, a so-called Gauss type wide-angle lens has been known as a wide-angle lens used for a photographic camera and a still video camera. A Gauss type lens system is a lens system in which a refractive power arrangement is substantially symmetric across an aperture stop. The Gauss type lens system includes lens systems described in Japanese Patent Application Laid-Open No. 2003-241084 and Japanese Patent Application Laid-Open No. 2009-258157. The lens systems described in Japanese Patent Application Laid-Open No. 2003-241084 and Japanese Patent Application Laid-Open No. 2009-258157 are wide-angle lenses at about F2.8.

Further, as a similar Gauss type lens system, there is a lens system described in Japanese Patent Application Laid-Open No. 2009-237542. The lens system described in Japanese Patent Application Laid-Open No. 2009-237542 is a large-diameter (about F1.8) standard lens. Further, as a lens system which has realized a further larger diameter (about F1.4), there is a lens system described in Japanese Patent Application Laid-Open No. 2010-66432.

In the Gauss type lens systems as described in the above publications of unexamined applications, a lens unit having a positive refractive power is located on an image side than an aperture stop, and the entire lens unit having this positive refractive power is brought up (moved toward an object side). Thus, the Gauss lens systems as described in the publications of unexamined applications are lens systems employing a so-called rear focus method.

SUMMARY OF THE INVENTION

An inner focus lens system of the present invention comprises, in order from an object side to an image side,
a first lens unit,
an aperture stop,
a second lens unit having a positive refractive power,
a third lens unit having a negative refractive power, and
a fourth lens unit having a positive refractive power,
wherein a total number of lens units in the inner focus lens system is four, which is the first lens unit, the second lens unit, the third lens unit, and the fourth lens unit,
wherein the first lens unit has at least one negative lens and at least one positive lens,
the second lens unit has at least one negative lens and at least one positive lens,
the third lens unit has at least one negative lens,
the fourth lens unit has at least one positive lens,
at the time of focusing on an object at a short distance from an object at infinity,
the third lens unit moves to the image side so as to lengthen a distance to the second lens unit and to shorten a distance to the fourth lens unit, and
the following conditional expression (1) is satisfied:

$$-6 < f_3/f < -1 \tag{1}$$

where f3 is a focal length of the third lens unit, and
f is a focal length of the entire inner focus lens system at the time of focusing on the object at infinity.

Further, an image pickup apparatus of the present invention comprises:
an inner focus lens system, and
an image pickup device located on an image side of the inner focus lens system and converting an image formed by the inner focus lens system into an electrical signal.

BRIEF DESCRIPTION OF THE DRAWINGS

FIG. 1A is a cross-sectional view of lenses of a first example, and FIG. 1B is a cross-sectional view of lenses of a second example.

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are aberration diagrams of the inner focus lens system of the first example, and aberration diagrams of three different focusing states.

FIG. 3A, FIG. 3B, FIG. 3C, FIG. 3D, FIG. 3E, FIG. 3F, FIG. 3G, FIG. 3H, FIG. 3I, FIG. 3J, FIG. 3K, and FIG. 3L are aberration diagrams of the inner focus lens system of the second example, and aberration diagrams of three different focusing states.

FIG. 8 is a configuration block diagram of an internal circuit of a main part of the digital camera of FIG. 6.

DETAILED DESCRIPTION OF THE INVENTION

Figure 1A:
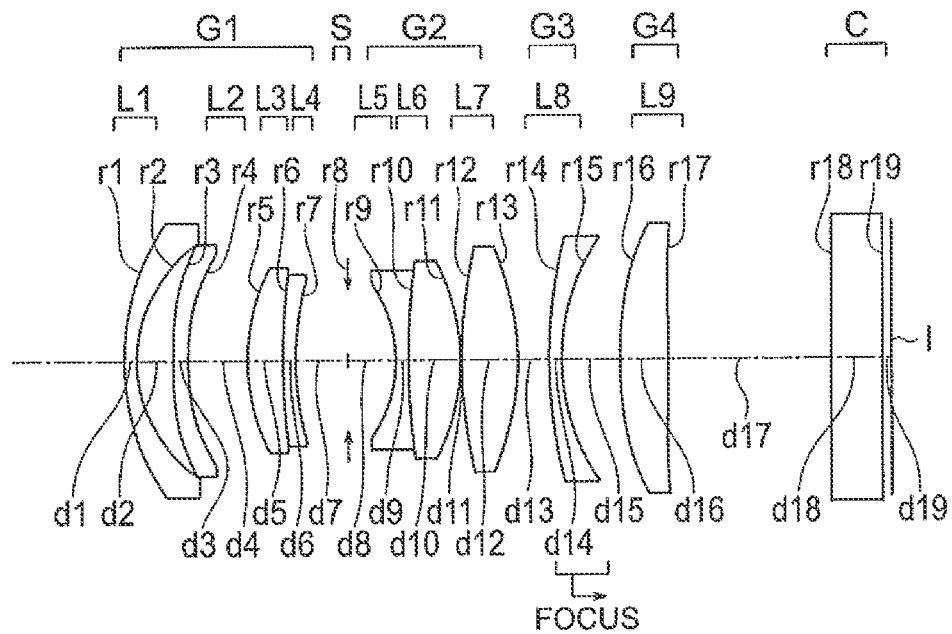
FIG. 1A and FIG. 1B are cross-sectional views of lenses in an inner focus lens systems of the present invention at the time of focusing on an object at infinity.

The following describes an inner focus lens system of the present embodiment.

The inner focus lens system of the present embodiment comprises, in order from an object side to an image side, a first lens unit, an aperture stop, a second lens unit having a positive refractive power, a third lens unit having a negative refractive power, and a fourth lens unit having a positive refractive power, wherein the first lens unit has at least one negative lens and at least one positive lens, the second lens unit has at least one negative lens and at least one positive lens, the third lens unit has at least one negative lens, the fourth lens unit has at least one positive lens, at the time of focusing on an object at a short distance from an object at infinity, the third lens unit moves to an image side so as to lengthen a distance to the second lens unit and to shorten a distance to the fourth lens unit, and the following conditional expression (1) is satisfied:

$$-6 < f_3/f < -1 \tag{1}$$

where $f_3$ is a focal length of the third lens, and
f is a focal length of the entire inner focus lens system at the time of focusing on the object at infinity.

In the inner focus lens system of the present embodiment, the lens units are located such that the first lens unit, the aperture stop, the second lens unit having a positive refractive power, and the third lens unit having a negative refractive power are located in this order from the object side. At the time of focusing on the object at a short distance from the object at infinity, the third lens unit is moved to the image side.

In the inner focus lens system of the present embodiment, the first lens unit and the second lens unit each include at least one negative lens and at least one positive lens, and the aperture stop is located between the first lens unit and the second lens unit. With such a configuration, main aberration correction is performed by lens units located on the object side than the third lens unit, namely, by the first lens unit and the second lens unit. This makes it possible to suppress a burden due to the aberration correction in the third lens unit. Here, as described above, since focusing is performed by the third lens unit, such a configuration is advantageous to reduction of the number of lenses in the lens unit to perform focusing, and the like.

Further, when a diameter of the lens system becomes large, aberration fluctuation due to the movement of the third lens unit at the time of focusing is easy to become large. Particularly, fluctuation of spherical aberration and curvature of field is easy to become large. In order to correct (reduce) this aberration fluctuation, it is preferable to make the refractive power of the third lens unit small to some extent.

However, when the refractive power of the third lens unit is made small, a focus driving amount (a moving amount of the third lens unit) at the time of focusing on the object at a short distance from the object at infinity is increased. Besides, as the moving amount is larger, a height of an off-axis light beam at a position of the third lens unit becomes higher, thereby resulting in that a lens diameter of the third lens unit becomes large. As such, if the refractive power of the third lens unit is made small, it is difficult to downsize the third lens unit.

In view of this, in the inner focus lens system of the present embodiment, the fourth lens unit is located on the image side than the third lens unit. At the time of focusing on an object at a short distance from an object at infinity, the third lens unit is moved to the image side so as to lengthen a distance to the second lens unit and to shorten a distance to the fourth lens unit.

The fourth lens unit is provided, so that the fourth lens unit can bear the correction of aberration fluctuation at the time of focusing on the object at a short distance. Further, since the fourth lens unit is provided, it is unnecessary for the refractive power of the third lens unit to be made small, so that the moving amount of the third lens unit at the time of focusing can be made small. As a result, the lens system can be downsized and a diameter of the lens system becomes large, at the same time, and further, it is easy to suppress upsizing of the lens system when a wide field angle is ensured.

In addition, a refractive power of the fourth lens unit is a positive refractive power, so that a back focus can be shortened and the lens system can be downsized. Further, it is preferable that the refractive power of the fourth lens unit be a positive refractive power, in view of excellent correction of a Petzval sum and chromatic aberration.

As such, it is preferable that a total number of lens units in the inner focus lens system be four, which is the first lens unit, the second lens unit, the third lens unit, and the fourth lens unit.

Further, it is preferable that the inner focus lens system of the embodiment satisfy the following conditional expression (1):

$$-6 < f_3/f < -1 \qquad (1)$$

Where $f_3$ is a focal length of the third lens, and f is a focal length of the entire inner focus lens system at the time of focusing on the object at infinity.

When a focal length of the third lens unit is defined by the conditional expression (1) appropriately, it is possible to suppress a size of the entire lens system and aberration fluctuation at the time of focusing on the object at a short distance, to be small.

If the lower limit of the conditional expression (1) is not reached, the focal length of the third lens unit becomes too large. In this case, the moving amount of the third lens unit at the time of focusing becomes large, which is disadvantageous to downsizing of the lens system. In addition, the Petzval sum becomes large, which makes it difficult to correct curvature of field and chromatic aberration. Thus, it is disadvantageous to the correction of these aberrations to be not reached the lower limit of the conditional expression (1).

If the upper limit of the conditional expression (1) is exceeded, the focal length of the third lens unit becomes too small. In this case, it is difficult to correct aberration in the entire lens system, and spherical aberration and coma at the time of focusing on the object at a short distance. Thus, it is disadvantageous to the correction of these aberrations to exceed the upper limit of the conditional expression (1).

Further, it is preferable that the inner focus lens system of the embodiment satisfy the following conditional expression (2):

$$0.5 < f_2/f < 3 \qquad (2)$$

where $f_2$ is a focal length of the second lens, and f is a focal length of the entire inner focus lens system at the time of focusing on the object at infinity.

When the focal length of the second lens unit is defined by the conditional expression (2) appropriately, the entire length of the lens system can be shortened and aberration can be corrected well.

To prevent below the lower limit of the conditional expression (2), a refractive power of the second lens unit can be suppressed from being too large. As a result, the occurrence of spherical aberration and chromatic aberration in the entire lens system can be reduced. Thus, it is advantageous for the reduction in the occurrence of these aberrations to prevent below the lower limit of the conditional expression (2).

To prevent above the upper limit of the conditional expression (2), an appropriate refractive power can be ensured in the second lens unit. As a result, the lens system can be downsized. Thus, it is advantageous for the downsizing of the lens system to prevent above the upper limit of the conditional expression (2).

Further, if a diameter of the lens system becomes large and an angle of view of the lens system is widened, spherical aberration and sagittal coma flare occur. Particularly, in such a configuration that the first lens unit has only one negative lens and one positive lens in order from an object, an amount of spherical aberration occurring when the diameter of the lens system becomes large and the angle of view is widened and an amount of sagittal coma flare occurring when the angle of view is widened become large. Because of this, in the configuration with one negative lens and one positive lens, it is difficult to correct these aberrations in the first lens unit.

In view of this, in the inner focus lens system of the present embodiment, the first lens unit has a plurality of negative lenses and at least one positive lens, and a lens on the most object side in the first lens unit is any one of the plurality of negative lenses.

Since the first lens unit has a plurality of negative lenses, that is, at least two negative lenses, spherical aberration and sagittal coma flare occurring in the positive lens can be corrected well. Further, since the negative lenses are located on the most object side, even if the angle of view is widened, an appropriate back focus can be ensured. As a result, the large diameter and the wide angle of view can be achieved in the lens system.

Further, in the inner focus lens system of the present embodiment, it is preferable that the first lens unit have at least four lenses.

Since the first lens unit has at least four lenses, various aberrations in the first lens unit and the entire lens system can be corrected well.

Further, in the inner focus lens system of the present embodiment, it is preferable that the first lens unit have a cemented lens in which a negative lens and a positive lens are cemented together, on the image side than the negative lens on the most object side.

Since the first lens unit includes a cemented lens of a negative lens and a positive lens separately from the negative lens on the most object side, chromatic aberration can be corrected well. Further, when the first lens unit has four lenses, various aberrations in the first lens unit and the entire lens system can be corrected well.

Further, in the inner focus lens system of the present embodiment, it is preferable that the second lens unit include a negative lens, a positive lens, and a positive lens in order from the object side.

Since the second lens unit includes a negative lens and positive lenses in order from the object side, the second lens unit accordingly includes a retrofocus-type lens configuration. As a result, a principal point position of the second lens unit can be positioned rather on the image side. Further, a sufficient back focus is ensured so that the height of an off-axis light beam in the third lens unit can be lowered.

Further, since the positive lenses are located on the image side, the second lens unit is configured to include two positive lenses. This allows the two positive lenses to bear the refractive power, thereby resulting in that aberration can be corrected well in the second lens unit, and in addition, decentration sensitivity of each of the negative lens and the two positive lenses can be reduced. Further, since the refractive power of the second lens unit is easy to be strengthened by the two positive lenses, it is advantageous for the downsizing of the lens system to include the two positive lenses.

Further, in the inner focus lens system of the present embodiment, it is preferable that the third lens unit consist of one negative lens.

As mentioned earlier, the third lens unit is a lens unit to be used for focusing. Therefore, if this lens unit is constituted by one lens, the lens unit can be reduced in weight. As a result, vibration and noise at the time of focusing can be reduced. Besides, focusing drive can be speeded up. Thus, it is advantageous for the reduction in vibration and noise and speeding-up of the focusing drive to constitute the third lens unit by one negative lens.

Further, in the inner focus lens system of the present embodiment, it is preferable that the fourth lens unit consist of one positive lens, or at most two lenses including one positive lens and one negative lens.

It is advantageous for the reduction in the entire length of the lens system to constitute the fourth lens unit by at most two lenses.

Further, in the inner focus lens system of the present embodiment, it is preferable that a refractive power of the first lens unit is a negative refractive power.

It is advantageous for securing of an appropriate back focus that the refractive power of the first lens unit is a negative refractive power.

Further, in the inner focus lens system of the present embodiment, it is preferable that an F number of the inner focus lens system be 2 or less and that a half angle of view of a light beam incident at a maximum image height position through a center of the aperture stop exceed 30°.

It is advantageous for securing of appropriate brightness and securing of a wide angle of view to set the F number to be 2 or less and to set the half angle of view to exceed 30°. Further, this configuration allows acquisition of an excellent image even by photographing in a dark place or photographing in a room.

Figure 4:
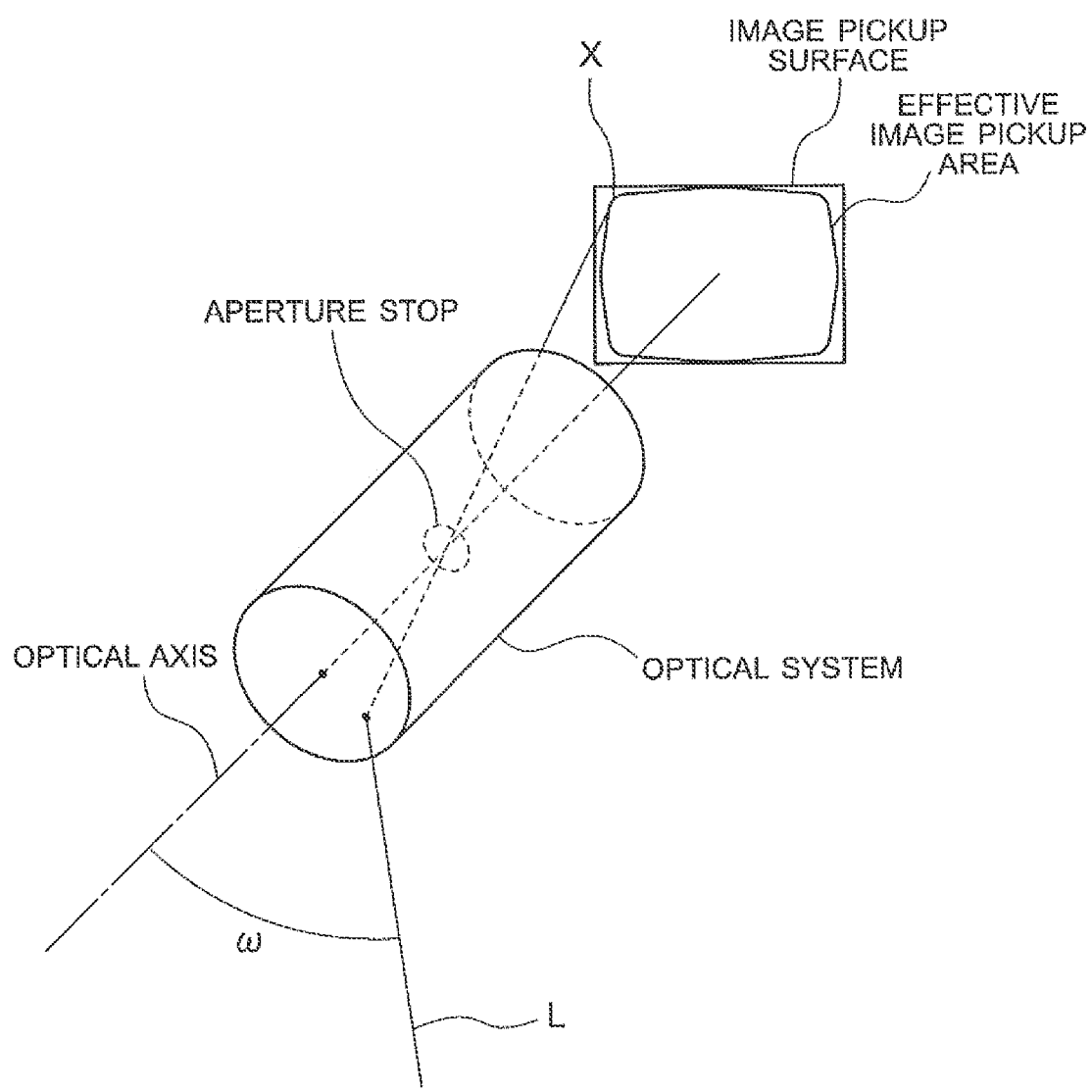
FIG. 4 is a view to explain a half angle of view.

Here, the following describes the half angle of view with reference to FIG. 4. FIG. 4 illustrates a state in which an optical system, an aperture stop, and an image pickup surface are located on an optical axis. Light beams incident on the optical system pass through the aperture stop, and are then emanated from the optical system to reach the image pickup surface. Here, the optical system in FIG. 4 is the inner focus lens system of the present embodiment. Further, ω denotes a half angle of view.

In FIG. 4, L shown in a full line denotes a light beam reaching a point X in an effective image pickup area, among light beams passing through a center of the aperture stop. This point X is a position farthest from the optical axis in the effective image pickup area. Here, since the effective image pickup area is an area where an object image is formed, the point X is at a maximum image height position. Thus, the light beam L is a light beam incident at the maximum image height position in the effective image pickup area through the center of the aperture stop. As illustrated in FIG. 4, the half angle of view ω is represented by an angle formed by the light beam L and the optical axis.

Further, in the inner focus lens system of the present embodiment, it is preferable that at the time of focusing on the object at a short distance from the object at infinity, positions of the first lens unit, the aperture stop, the second lens unit, and the fourth lens unit be fixed.

It is advantageous for prevention of contaminant to the lens system and noise reduction at the time of focusing drive that the positions of the first lens unit, the second lens unit, and the fourth lens unit are fixed (the first lens unit, the second lens unit, and the fourth lens unit stand still) at the time of focusing.

Further, in the inner focus lens system of the present embodiment, it is preferable that an exit plane of the first lens unit and an incidence plane of the second lens unit be concave toward an aperture-stop side.

It is advantageous for correction of the Petzval sum that the exit plane of the first lens unit and the incidence plane of the second lens unit are concave toward the aperture-stop side.

Further, it is preferable that the inner focus lens system of the present embodiment satisfy the following conditional expressions (3) and (4):

$$-0.3 < f_2/f_1 < 0.3 \qquad (3)$$

$$0.02 < D_s/f_2 < 0.7 \qquad (4)$$

where $f_1$ is a focal length of the first lens,
$f_2$ is a focal length of the second lens, and
$D_s$ is a distance on the optical axis from the exit plane of the first lens unit to the aperture stop.

The conditional expression (3) is a condition to define a range of optimum focal lengths of the first lens unit and the second lens unit.

To prevent below the lower limit of the conditional expression (3), the refractive power of the first lens unit does not become a large negative refractive power. This makes it possible to easily suppress the occurrence of spherical aberration and coma in the first lens unit.

To prevent above the upper limit of the conditional expression (3), the refractive power of the first lens unit does not become a large positive refractive power. This is advantageous for securing of an appropriate back focus.

The conditional expression (4) is an advantageous condition to the reduction in the entire length of the lens system.

It is advantageous for securing of a space where a mechanical mechanism of the aperture stop is to be located to ensure a distance from the first lens unit to the aperture stop appropriately so as to prevent below the lower limit of the conditional expression (4).

To prevent above the upper limit of the conditional expression (4) leads to the reduction in the entire length of the lens system.

Further, an image pickup apparatus of the present embodiment includes the inner focus lens system, and an image pickup device located on an image side of the inner focus lens system and converting an image formed by the inner focus lens system into an electrical signal.

If the aforementioned inner focus lens system is included, an image pickup apparatus which takes advantage of this lens system can be provided.

Further, in order that functions (working-effects) are ensured more, it is preferable that each of the above conditional expressions have the following upper limit and lower limit.

In regard to the conditional expression (1):
The lower limit is preferably −4, further preferably −3.
The upper limit is preferably −1.7, further preferably −2.5.
In regard to the conditional expression (2):
The lower limit is preferably 0.9, further preferably 1.2.
The upper limit is preferably 2, further preferably 1.5.
In regard to the conditional expression (3):
The lower limit is preferably −0.2, further preferably −0.1.
The upper limit is preferably 0.1, further preferably 0.
In regard to the conditional expression (4):
The lower limit is preferably 0.07, further preferably 0.1.
The upper limit is preferably 0.5, further preferably 0.3.

Note that the above inner focus lens system may satisfy a plurality of configurations at the same time. This is preferable in order to obtain an excellent inner focus lens system and an excellent image pickup apparatus. Further, preferable configurations can be optionally combined. Furthermore, in regard to each conditional expression, only an upper limit or a lower limit in a numerical range of a more limited conditional expression may be limited.

The following describes examples of the inner focus lens system and the image pickup apparatus according to the present invention in detail based on the drawings. It should be understood that the present invention is not limited by the examples.

The examples shown below deal with a bright inner focus lens system having an angle of view of 60° or more and an F number of 2 or less. Further, this inner focus lens system is preferably used for a taking lens of a camera such as a digital still camera.

Figure 1B:
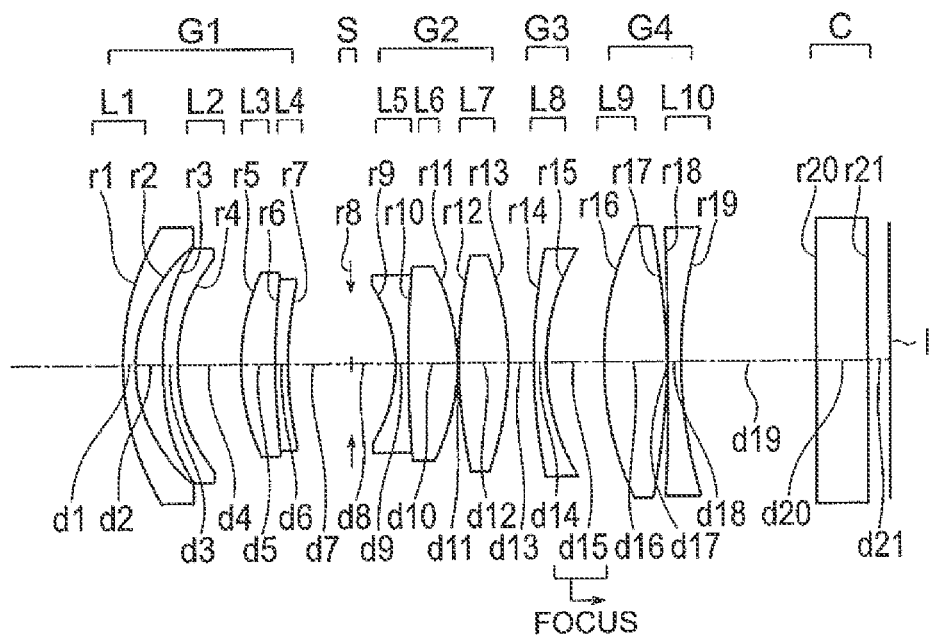

The following describes Examples 1 and 2 of the inner focus lens system of the present invention. FIG. 1A and FIG. 1B are cross-sectional views of lenses at the time of focusing on an object at infinity according to Examples 1 and 2, respectively. In the figures, a first lens unit is represented by G1, an aperture stop is represented by S, a second lens unit is represented by G2, a third lens unit is represented by G3, a fourth lens unit is represented by G4, a parallel plate is represented by C, and an image surface is represented by I. Note that in FIG. 1A and FIG. 1B, filters (a dust removal filter, an infrared cut filter, a low pass filter) and a cover glass protecting an image pickup surface are illustrated as one optically equivalent parallel plate C.

The inner focus lens system of Example 1 is constituted by, in order from an object side, a first lens unit G1 having a negative refractive power, an aperture stop S, a second lens unit G2 having a positive refractive power, a third lens unit G3 having a negative refractive power, and a fourth lens unit G4 having a positive refractive power, as illustrated in FIG. 1A.

At the time of focusing on an object at a short distance from an object at infinity, the first lens unit G1 stands still, the aperture stop S stands still, the second lens unit G2 stands still, the third lens unit G3 moves to the image side, and the fourth lens unit G4 stands still.

The first lens unit G1 is constituted by, in order from the object side, a negative meniscus lens L1 facing its convex surface toward the object side, a negative meniscus lens L2 facing its convex surface toward the object side, a positive meniscus lens L3 facing its convex surface toward the object side, and a negative meniscus lens L4 facing its convex surface toward the object side. Here, the positive meniscus lens L3 and the negative meniscus lens L4 are cemented together. The second lens unit G2 is constituted by a biconcave negative lens L5, a biconvex positive lens L6, and a biconvex positive lens L7. Here, the biconcave negative lens L5 and the biconvex positive lens L6 are cemented together. The third lens unit G3 is constituted by a negative meniscus lens L8 facing its convex surface toward the object side. The fourth lens unit G4 is constituted by a biconvex positive lens L9. An image side surface (a light-beam exit plane) of the negative meniscus lens L4 and an object side surface (a light-beam incidence plane) of the biconvex negative lens L5 are both concave toward an aperture-stop side.

Aspheric surfaces are used for six surfaces in total, i.e., both surfaces of the negative meniscus lens L2, both surfaces of the biconvex positive lens L7, and both surfaces of the biconvex positive lens L9.

The inner focus lens system of Example 2 is constituted by, in order from an object side, a first lens unit G1 having a negative refractive power, an aperture stop S, a second lens unit G2 having a positive refractive power, a third lens unit G3 having a negative refractive power, and a fourth lens unit G4 having a positive refractive power, as illustrated in FIG. 1B.

At the time of focusing on an object at a short distance from an object at infinity, the first lens unit G1 stands still, the aperture stop S stands still, the second lens unit G2 stands still, the third lens unit G3 moves to the image side, and the fourth lens unit G4 stands still.

The first lens unit G1 is constituted by, in order from the object side, a negative meniscus lens L1 facing its convex surface toward the object side, a negative meniscus lens L2 facing its convex surface toward the object side, a positive meniscus lens L3 facing its convex surface toward the object side, and a negative meniscus lens L4 facing its convex surface toward the object side and facing it concave surface toward an aperture stop S side. Here, the positive meniscus lens L3 and the negative meniscus lens L4 are cemented together. The second lens unit G2 is constituted by a biconcave negative lens L5, a biconvex positive lens L6, and a biconvex positive lens L7. Here, the biconcave negative lens L5 and the biconvex positive lens L6 are cemented together. The third lens unit G3 is constituted by a negative meniscus lens L8 facing its convex surface toward the object side. The fourth lens unit G4 is constituted by a biconvex positive lens L9 and a biconcave negative lens L10. An image side surface (a light-beam exit plane) of the negative meniscus lens L4 and an object side surface (a light-beam incidence plane) of the biconcave negative lens L5 are both concave toward an aperture-stop side.

Aspheric surfaces are used for six surfaces in total, i.e., both surfaces of the negative meniscus lens L2, both surfaces of the biconvex positive lens L7, and both surfaces of the biconvex positive lens L9.

Numerical data of each example described above is shown below. Apart from symbols described above, r denotes radius of curvature of each lens surface, d denotes a distance between respective lens surfaces, nd denotes a refractive index of each lens for a d-line, and vd denotes an Abbe constant for each lens. Further, a focal length denotes a focal length of the entire system, FNO. denotes an F number, ω denotes a half angle of view, and each of f1, f2 . . . is a focal length of each lens unit. Note that the entire length is a length which is obtained by adding a back focus to a distance from a lens forefront surface up to a lens backmost surface. Further, fb (back focus) is a unit which is expressed upon air conversion of a distance from the lens backmost surface to a paraxial image surface.

Further, in regard to a focusing state, "Infinity" denotes a state when it focused on an object at infinity, "Magnification is $-1/10$" denotes a state when it focused on an object at the time when the magnification is $-1/10$, and "Object-Image distance is 200 mm" denotes a state when it focused on an object at the time when a distance from the object to an image is 200 mm. Note that a state where it focused on an object at a short distance is, for example, a state of the "Object-Image distance is 200 mm".

When x is let to be an optical axis with a direction of traveling of light as a positive (direction), and y is let to be in a direction orthogonal to the optical axis, a shape of the aspheric surface is described by the following expression.

$$x=(y^2/R)/[1+\{1-(K+1)(y/R)^2\}^{1/2}]+A4y^4+A6y^6+A8y^8+A10y^{10}+A12y^{12}$$

where, R denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

Example 1

| Unit mm | | | | |
|---|---|---|---|---|
| Surface data | | | | |
| Surface no. | r | d | nd | vd |
| Object plane | ∞ | ∞ | | |
| 1 | 19.745 | 1.00 | 1.60300 | 65.44 |
| 2 | 11.316 | 2.85 | | |
| 3* | 58.287 | 1.20 | 1.68893 | 31.08 |
| 4* | 26.720 | 4.67 | | |
| 5 | 16.110 | 2.78 | 1.92286 | 20.88 |
| 6 | 53.780 | 1.00 | 1.58144 | 40.75 |
| 7 | 23.507 | 4.18 | | |
| 8 (stop) | ∞ | 3.78 | | |
| 9 | −10.768 | 1.00 | 1.92286 | 20.88 |
| 10 | 56.607 | 4.12 | 1.83481 | 42.71 |
| 11 | −16.919 | 0.10 | | |
| 12* | 35.628 | 4.44 | 1.80610 | 40.92 |
| 13* | −20.176 | Variable | | |
| 14 | 39.086 | 1.00 | 1.68893 | 31.07 |
| 15 | 17.000 | Variable | | |
| 16* | 33.338 | 3.80 | 1.80610 | 40.92 |
| 17* | −186.188 | 12.76 | | |
| 18 | ∞ | 4.08 | 1.51633 | 64.14 |
| 19 | ∞ | 0.75 | | |
| Image plane (Image pickup surface) | ∞ | | | |

Aspherical surface data

3rd surface k = 26.612
A4 = 3.06498e−04, A6 = −3.00399e−06, A8 = 1.42771e−08,
A10 = 6.05212e−11, A12 = −1.18433e−12

4th surface k = 1.305
A4 = 3.21226e−04, A6 = −2.66717e−06, A8 = −2.96071e−09,
A10 = 3.39774e−10, A12 = −3.41764e−12

12th surface k = 0.000
A4 = −3.80048e−05, A6 = 4.95630e−07, A8 = −5.02094e−09,
A10 = 2.18585e−11

13th surface k = 0.000
A4 = 1.71864e−05, A6 = 4.31519e−07, A8 = −4.84879e−09,
A10 = 2.20282e−11

16th surface k = 0.000
A4 = 2.91468e−05, A6 = 1.40438e−07, A8 = 2.92331e−09,
A10 = −6.23715e−11, A12 = 2.90363e−13

17th surface k = 0.000
A4 = 3.25935e−05, A6 = −1.84853e−07, A8 = 8.71138e−09,
A10 = −1.15676e−10, A12 = 4.72611e−13

| Various data | |
|---|---|
| Focal length | 16.02 |
| Fno. | 1.72 |
| Angle of field 2ω | 72.98 |
| fb (in air) | 16.20 |
| Lens total length (in air) | 59.18 |
| Image height | 10.82 |

| In focus state | |
|---|---|
| Infinity | |
| d13 | 2.47 |
| d15 | 4.59 |
| Magnification is $-1/10$ | |
| d13 | 3.30 |
| d15 | 3.76 |
| Object-Image distance is 200 mm | |
| d13 | 5.21 |
| d15 | 1.85 |

| Unit focal length | | | |
|---|---|---|---|
| f1 = −385.32 | f2 = 19.42 | f3 = −44.49 | f4 = 35.35 |

Example 2

| Unit mm | | | | |
|---|---|---|---|---|
| Surface data | | | | |
| Surface no. | r | d | nd | vd |
| Object plane | ∞ | ∞ | | |
| 1 | 21.644 | 1.00 | 1.60300 | 65.44 |
| 2 | 12.026 | 2.12 | | |
| 3* | 30.305 | 1.20 | 1.68893 | 31.08 |
| 4* | 17.732 | 4.99 | | |
| 5 | 17.328 | 2.69 | 1.92286 | 20.88 |
| 6 | 59.102 | 1.00 | 1.58144 | 40.75 |
| 7 | 29.113 | 5.04 | | |
| 8 (stop) | ∞ | 3.51 | | |
| 9 | −11.676 | 1.00 | 1.92286 | 20.88 |
| 10 | 85.427 | 3.91 | 1.83481 | 42.71 |
| 11 | −16.784 | 0.10 | | |
| 12* | 36.189 | 3.92 | 1.80610 | 40.92 |
| 13* | −22.804 | Variable | | |
| 14 | 44.009 | 1.00 | 1.68893 | 31.07 |
| 15 | 17.291 | Variable | | |
| 16* | 28.209 | 4.95 | 1.80610 | 40.92 |
| 17* | −40.225 | 0.10 | | |
| 18 | −268.143 | 1.00 | 1.59270 | 35.31 |
| 19 | 36.680 | 10.62 | | |
| 20 | ∞ | 4.08 | 1.51633 | 64.14 |
| 21 | ∞ | 1.74 | | |
| Image plane (Image pickup surface) | ∞ | | | |

Aspherical surface data

3rd surface k = 7.554
A4 = 2.07444e−04, A6 = −1.67966e−06, A8 = −6.42096e−09,
A10 = 2.19295e−10, A12 = −1.74479e−12

4th surface k = −1.325
A4 = 2.82036e−04, A6 = −1.24246e−06, A8 = −1.91341e−08,
A10 = 4.35944e−10, A12 = −3.35543e−12

12th surface k = 0.000
A4 = −3.54666e−05, A6 = 5.70299e−07, A8 = −6.52032e−09,
A10 = 2.52235e−11

13th surface k = 0.000
A4 = 1.19746e−05, A6 = 4.42517e−07, A8 = −5.27387e−09,
A10 = 1.86903e−11

16th surface k = 0.000
A4 = 2.31959e−05, A6 = 8.72773e−08, A8 = 4.98712e−10,
A10 = −2.25790e−11, A12 = 8.32884e−14

17th surface k = 0.000
A4 = 4.02466e−05, A6 = −1.35944e−07, A8 = 3.42392e−09,
A10 = −4.82780e−11, A12 = 1.65637e−13

Various data

| | |
|---|---|
| Focal length | 16.00 |
| Fno. | 1.72 |
| Angle of field 2ω | 73.16 |
| fb (in air) | 15.06 |
| Lens total length (in air) | 59.18 |
| Image height | 10.82 |

Unit mm

| In focus state | |
|---|---|
| Infinity | |
| d13 | 2.00 |
| d15 | 4.59 |
| Magnification is −1/10 | |
| d13 | 2.83 |
| d15 | 3.76 |
| Object-Image distance is 200 mm | |
| d13 | 4.74 |
| d15 | 1.85 |

| Unit focal length | | | |
|---|---|---|---|
| f1 = −306.62 | f2 = 20.17 | f3 = −41.98 | f4 = 32.62 |

Aberration diagrams of Examples 1 and 2 described above are shown in FIG. 2A to FIG. 2L and FIG. 3A to FIG. 3L, respectively. Further, in each diagram, "FIY" denotes a maximum image height.

In these aberration diagrams, respective FIG. 2A to FIG. 2D and respective FIG. 3A to FIG. 3D show spherical aberration (SA), astigmatism (AS), distortion (DT), and chromatic aberration of magnification (CC) at the time of focusing on an object at infinity.

Further, respective FIG. 2E to FIG. 2H and respective FIG. 3E to FIG. 3H show spherical aberration (SA), astigmatism (AS), distortion (DT), and chromatic aberration of magnification (CC) when a magnification is −1/10.

Further, respective FIG. 2I to FIG. 2L and respective FIG. 3I to FIG. 3L show spherical aberration (SA), astigmatism (AS), distortion (DT), and chromatic aberration of magnification (CC) when an object-image distance is 200 mm.

Next, the values of conditional expressions (1) to (4) in each embodiment are shown below.

| Conditional expressions | Example 1 | Example 2 |
|---|---|---|
| (1) $f_3/f$ | −2.78 | −2.62 |
| (2) $f_2/f$ | 1.21 | 1.26 |
| (3) $f_2/f_1$ | −0.05 | −0.07 |
| (4) $D_s/f_2$ | 0.22 | 0.25 |

Figure 5:
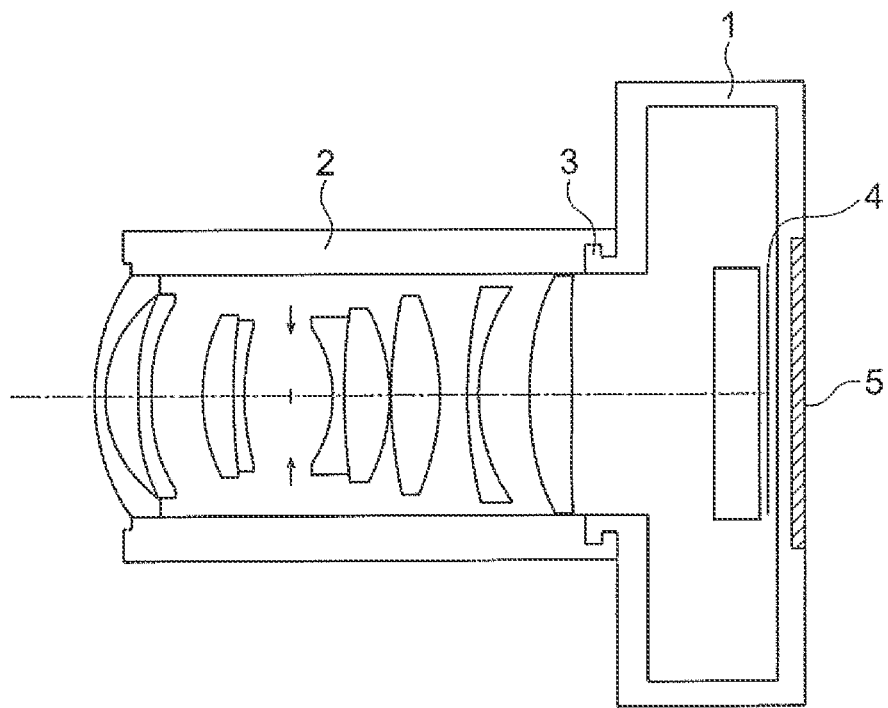
FIG. 5 is a cross-sectional view of a lens-exchangeable camera using an inner focus lens system according to the present invention as an exchangeable lens.

FIG. 5 is a cross-sectional view of a single-lens mirrorless camera as an image pickup apparatus. As shown in FIG. 5, 1 denotes a single-lens mirrorless camera, 2 denotes an photographic lens system disposed inside a lens barrel, and 3 denotes a lens mount of the lens barrel. The lens mount 3 enable to the photographic lens system 2 to be detachable from the single-lens mirrorless camera 1. A screw type mount or a bayonet type mount is used as the lens mount 3. In this example, the bayonet type mount is used. Further, 4 denotes an image pickup element surface and 5 denotes a back monitor. Also, a small-size CCD (charge coupled device) or a CMOS (complementary metal oxide semiconductor) is used as an image pickup element.

The inner focus lens system according to the present invention, described in the first example or the second example, is used as the photographic lens system 2 of the single-lens mirrorless camera 1.

Figure 6:
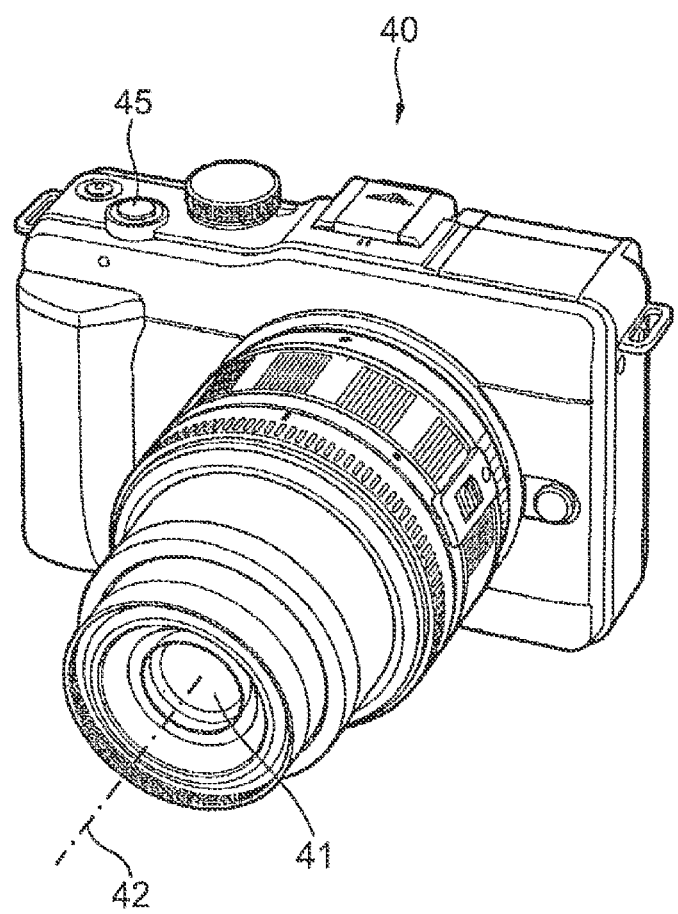
FIG. 6 is a front perspective view illustrating an appearance of a digital camera according to the present invention.
Figure 7:
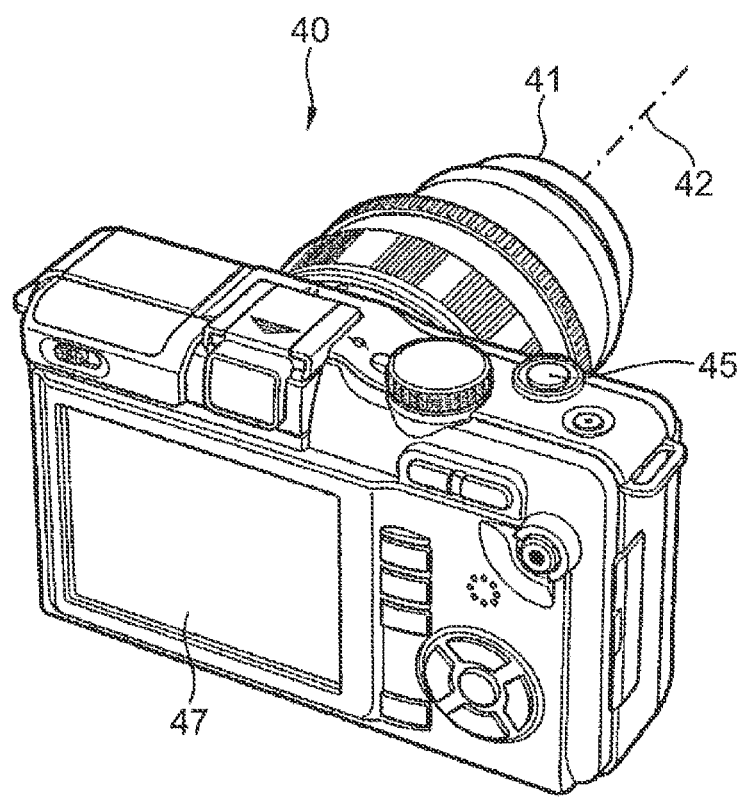
FIG. 7 is a rear perspective view of the digital camera of FIG. 6.

FIG. 6 and FIG. 7 show conceptual diagrams of a structure of the image pickup apparatus according to the present invention. FIG. 6 is a front perspective view showing an appearance of a digital camera 40 as an image pickup apparatus, and FIG. 7 is a rear perspective view showing an appearance of the digital camera 40. The inner focus lens system according to the present invention is used for a photographic optical system 41 of the digital camera 40.

The digital camera 40 according to the embodiment includes the photographic optical system 41 positioned on a capturing optical path 42, a shutter button 45, and a liquid-crystal display monitor 47. When the shutter button 45 disposed on an upper portion of the digital camera 40 is pressed, in conjunction with the pressing of the shutter button 45, an image is captured through the photographic optical system 41 such as the inner focus lens system according to the first example. An object image which has been formed by the photographic optical system 41 is formed on an image pickup element (photoelectric conversion surface) provided near an image forming surface. The object image which has been received by the image pickup element is displayed as an electronic image on the liquid-crystal display monitor 47 provided on a rear surface of the digital camera by a processing unit. Moreover, it is possible to record the electronic image which has been captured in a recording unit.

FIG. 8 is a block diagram showing an internal circuit of main components of the digital camera 40. In the following description, the processing unit mentioned above includes components such as CDS/ADC section 24, a temporary storage memory section 17, and an image processing section 18. A storage unit includes a storage medium section 19.

As shown in FIG. 8, the digital camera 40 includes an operating section 12, a control section 13 which is connected to the operating section 12, an imaging drive circuit 16 which is connected to a control-signal output port of the control section 13 via buses 14 and 15, the temporary storage memory section 17, the image processing section 18, a storage medium section 19, a display section 20, and a set-information storage memory section 21.

The temporary storage memory section 17, the image processing section 18, the storage medium section 19, the display section 20, and the set-information storage memory section 21 are capable of inputting and outputting data mutually via a bus 22. Moreover, a CCD 49 and the CDS/ADC section 24 are connected to the imaging drive circuit 16.

The operating section 12 includes various input buttons and switches, and imparts event information input from outside (user of camera) via the input buttons and switches to the control section 13. The control section 13 is a central arithmetic processing unit such as a CPU with a built-in program memory which is not shown in the diagram, and controls the overall digital camera 40 according to a computer program which has been stored in the computer program memory.

The CCD 49 is an image pickup element which is driven and controlled by the imaging drive circuit 16, and which converts an amount of light for each pixel of the object image which has been formed through the photographic optical system 41 to an electric signal, and outputs to the CDS/ADC section 24.

The CDS/ADC section 24 is a circuit which amplifies the electric signal input from the CCD 49, and also carries out analog-to-digital conversion, and outputs image raw-data only for the amplification and digital conversion carried out (Bayer data, hereinafter called as 'RAW data') to the temporary storage memory section 17.

The temporary storage memory section 17 is a buffer such as a SDRAM, and is a memory unit which temporarily stores the RAW data output put from the CDS/ADC section 24. The image processing section 18 is a circuit which reads the RAW data which has been stored in the temporary storage memory section 17 or the RAW data which has been stored in the storage medium section 19, and carries out electrically, various image processing including a distortion correction based on image-quality parameters which have been specified by the control section 13.

The recording medium section 19 in which, a recording medium in the form of a stick or a card with a flash memory is detachably mounted, records and maintains the RAW data which is transferred from the temporary storage memory section 17 and image data which has been subjected to image processing in the image processing section 18.

The display section 20 includes the liquid-crystal display monitor 47 and displays operation menu, image data, and RAW data captured. The set-information storage memory section 21 is provided with a ROM section in which various image-quality parameters are stored in advance, and a RAM section which stores the image-quality parameters which have been read from the ROM section by an input and output operation of the operating section 12.

The digital camera 40 which is structured in such manner, by adopting the inner focus lens system according to the present invention as the photographic optical system 41, it possible to let to be an image pickup apparatus which is advantageous for wide angle of view, small-sizing and obtaining an image in high resolution without deteriorating image quality.

As described above, the inner focus lens system and the image pickup apparatus according to the present invention are useful to obtain an image in high resolution without deteriorating image quality in a large area.

What is claimed is:

1. An inner focus lens system comprising, in order from an object side to an image side,
a first lens unit,
an aperture stop,
a second lens unit having a positive refractive power,
a third lens unit having a negative refractive power, and
a fourth lens unit having a positive refractive power,
wherein a total number of lens units in the inner focus lens system is four, which is the first lens unit, the second lens unit, the third lens unit, and the fourth lens unit,
wherein the first lens unit has at least two negative lenses and at least one positive lens,
the second lens unit has at least one negative lens and at least one positive lens,
the third lens unit has at least one negative lens,
the fourth lens unit has at least one positive lens,
at a time of focusing on an object at a short distance from an object at infinity, the third lens unit moves to the image side so as to lengthen a distance to the second lens unit and to shorten a distance to the fourth lens unit, and
the following conditional expression (1) is satisfied:

$$-6 < f_3/f < -1 \qquad (1)$$

where $f_3$ is a focal length of the third lens unit, and
f is a focal length of the inner focus lens system at the time of focusing on the object at infinity.

2. The inner focus lens system according to claim 1, wherein the following conditional expression (2) is satisfied:

$$0.5 < f_2/f < 3 \qquad (2)$$

where $f_2$ is a focal length of the second lens unit.

3. The inner focus lens system according to claim 1, wherein the first lens unit has a plurality of negative lenses and at least one positive lens, and a lens on a most object side in the first lens unit is any one of the plurality of negative lenses.

4. The inner focus lens system according to claim 3, wherein the first lens unit has at least four lenses.

5. The inner focus lens system according to claim 3, wherein the first lens unit has a cemented lens in which a negative lens and a positive lens are cemented together, on the image side than the negative lens on the most object side.

6. The inner focus lens system according to claim 1, wherein the second lens unit comprises, in order from the object side, a negative lens, a positive lens, and a positive lens, and a total number of lenses in the second lens unit is three.

7. The inner focus lens system according to claim 1, wherein the third lens unit consists of one negative lens.

8. The inner focus lens system according to claim 1, wherein the fourth lens unit consists of one positive lens, or at most two lenses including one positive lens and one negative lens.

9. The inner focus lens system according to claim 1, wherein a refractive power of the first lens unit is a negative refractive power.

10. The inner focus lens system according to claim 1, wherein an F number of the inner focus lens system is 2 or less, and
a half angle of view of a light beam incident at a maximum image height position through a center of the aperture stop exceeds 30°.

11. The inner focus lens system according to claim 1, wherein at the time of focusing on the object at a short distance from the object at infinity, positions of the first lens unit, the aperture stop, the second lens unit, and the fourth lens unit are fixed.

12. The inner focus lens system according to claim 1, wherein an exit surface of the first lens unit and an incidence surface of the second lens unit are concave toward an aperture stop side.

13. The inner focus lens system according to claim 1, wherein the following conditional expression (4) is satisfied:

$$0.02 < D_s/f_2 < 0.7 \qquad (4)$$

where
$f_2$ is a focal length of the second lens unit, and
$D_s$ is a distance on an optical axis from an exit surface of the first lens unit to the aperture stop.

14. An image pickup apparatus comprising:
the inner focus lens system according to claim 1, and
an image pickup device located on an image side of the inner focus lens system and converting an image formed by the inner focus lens system into an electrical signal.

15. An inner focus lens system comprising, in order from an object side to an image side,
a first lens unit,
an aperture stop,
a second lens unit having a positive refractive power,
a third lens unit having a negative refractive power, and
a fourth lens unit having a positive refractive power,
wherein a total number of lens units in the inner focus lens system is four, which is the first lens unit, the second lens unit, the third lens unit, and the fourth lens unit,
wherein the first lens unit has at least one negative lens and at least one positive lens,
the second lens unit has at least one negative lens and at least one positive lens,
the third lens unit has at least one negative lens,
the fourth lens unit has at least one positive lens,
at a time of focusing on an object at a short distance from an object at infinity, the third lens unit moves to the image side so as to lengthen a distance to the second lens unit and to shorten a distance to the fourth lens unit,
an F number of the inner focus lens system is 2 or less,
a half angle of view of a light beam incident at a maximum image height position through a center of the aperture stop exceeds 30°, and
the following conditional expression (1) is satisfied:

$$-6 < f_3/f < -1 \qquad (1)$$

where $f_3$ is a focal length of the third lens unit, and
f is a focal length of the inner focus lens system at the time of focusing on the object at infinity.

16. The inner focus lens system according to claim 15, wherein the following conditional expression (2) is satisfied:

$$0.5 < f_2/f < 3 \qquad (2)$$

where $f_2$ is a focal length of the second lens unit.

17. The inner focus lens system according to claim 15, wherein the first lens unit has a plurality of negative lenses and at least one positive lens, and a lens on a most object side in the first lens unit is any one of the plurality of negative lenses.

18. The inner focus lens system according to claim 17, wherein the first lens unit has at least four lenses.

19. The inner focus lens system according to claim 17, wherein the first lens unit has a cemented lens in which a negative lens and a positive lens are cemented together, on the image side than the negative lens on the most object side.

20. The inner focus lens system according to claim 15, wherein the second lens unit comprises, in order from the object side, a negative lens, a positive lens, and a positive lens, and a total number of lenses in the second lens unit is three.

21. The inner focus lens system according to claim 15, wherein the third lens unit consists of one negative lens.

22. The inner focus lens system according to claim 15, wherein the fourth lens unit consists of one positive lens, or at most two lenses including one positive lens and one negative lens.

23. The inner focus lens system according to claim 15, wherein a refractive power of the first lens unit is a negative refractive power.

24. The inner focus lens system according to claim 15, wherein at the time of focusing on the object at a short distance from the object at infinity, positions of the first lens unit, the aperture stop, the second lens unit, and the fourth lens unit are fixed.

25. The inner focus lens system according to claim 15, wherein an exit surface of the first lens unit and an incidence surface of the second lens unit are concave toward an aperture stop side.

26. The inner focus lens system according to claim 15, wherein the following conditional expression (4) is satisfied:

$$0.02 < D_s/f_2 < 0.7 \qquad (4)$$

where $f_2$ is a focal length of the second lens unit, and
$D_s$ is a distance on an optical axis from an exit surface of the first lens unit to the aperture stop.

27. An image pickup apparatus comprising:
the inner focus lens system according to claim 15, and
an image pickup device located on an image side of the inner focus lens system and converting an image formed by the inner focus lens system into an electrical signal.

28. An inner focus lens system comprising, in order from an object side to an image side,
a first lens unit,
an aperture stop,
a second lens unit having a positive refractive power,
a third lens unit having a negative refractive power, and
a fourth lens unit having a positive refractive power,
wherein a total number of lens units in the inner focus lens system is four, which is the first lens unit, the second lens unit, the third lens unit, and the fourth lens unit,
wherein the first lens unit has at least one negative lens and at least one positive lens,
the second lens unit has at least one negative lens and at least one positive lens,
the third lens unit has at least one negative lens,
the fourth lens unit has at least one positive lens,
at a time of focusing on an object at a short distance from an object at infinity, the third lens unit moves to the image side so as to lengthen a distance to the second lens unit and to shorten a distance to the fourth lens unit,
an exit surface of the first lens unit and an incidence surface of the second lens unit are concave toward an aperture stop side, and
the following conditional expression (1) is satisfied:

$$-6 < f_3/f < -1 \qquad (1)$$

where $f_3$ is a focal length of the third lens unit, and
f is a focal length of the inner focus lens system at the time of focusing on the object at infinity.

29. The inner focus lens system according to claim 28,
wherein the following conditional expression (2) is satisfied:

$$0.5 < f_2/f < 3 \qquad (2)$$

where $f_2$ is a focal length of the second lens unit.

30. The inner focus lens system according to claim 29,
wherein a refractive power of the first lens unit is a negative refractive power.

31. The inner focus lens system according to claim 28,
wherein the first lens unit has a plurality of negative lenses and at least one positive lens, and a lens on a most object side in the first lens unit is any one of the plurality of negative lenses.

32. The inner focus lens system according to claim 31,
wherein the first lens unit has at least four lenses.

33. The inner focus lens system according to claim 31,
wherein the first lens unit has a cemented lens in which a negative lens and a positive lens are cemented together, on the image side than the negative lens on the most object side.

34. The inner focus lens system according to claim 28,
wherein the second lens unit comprises, in order from the object side, a negative lens, a positive lens, and a positive lens, and a total number of lenses in the second lens unit is three.

35. The inner focus lens system according to claim 28,
wherein the third lens unit consists of one negative lens.

36. The inner focus lens system according to claim 28,
wherein the fourth lens unit consists of one positive lens, or at most two lenses including one positive lens and one negative lens.

37. The inner focus lens system according to claim 28,
wherein an F number of the inner focus lens system is 2 or less, and
a half angle of view of a light beam incident at a maximum image height position through a center of the aperture stop exceeds 30°.

38. The inner focus lens system according to claim 28,
wherein at the time of focusing on the object at a short distance from the object at infinity, positions of the first lens unit, the aperture stop, the second lens unit, and the fourth lens unit are fixed.

39. The inner focus lens system according to claim 28,
wherein the following conditional expression (4) is satisfied:

$$0.02 < D_s/f_2 < 0.7 \qquad (4)$$

where $f_2$ is a focal length of the second lens unit, and
$D_s$ is a distance on an optical axis from an exit surface of the first lens unit to the aperture stop.

40. An image pickup apparatus comprising:
the inner focus lens system according to claim 28, and
an image pickup device located on an image side of the inner focus lens system and converting an image formed by the inner focus lens system into an electrical signal.

* * * * *